United States Patent
Coffey

[19]

[11] Patent Number: 5,830,102

[45] Date of Patent: Nov. 3, 1998

[54] FIVE-SPEED POWER TRANSMISSION

[75] Inventor: Dan Coffey, Northville, Mich.

[73] Assignee: General Motors Corporation, Detroit, Mich.

[21] Appl. No.: 869,717

[22] Filed: Jun. 5, 1997

[51] Int. Cl.⁶ .................................................. F16H 3/58
[52] U.S. Cl. .......................................... 475/285; 475/289
[58] Field of Search .................................. 475/284, 285, 475/288, 289

[56] References Cited

U.S. PATENT DOCUMENTS

| | | | |
|---|---|---|---|
| 3,597,999 | 8/1971 | Fisher | 475/285 |
| 5,141,477 | 8/1992 | Oshidari | 475/330 |
| 5,525,117 | 6/1996 | Morisawa et al. | 475/285 |
| 5,567,201 | 10/1996 | Ross | 475/280 |

*Primary Examiner*—Dirk Wright
*Attorney, Agent, or Firm*—Donald F. Scherer

[57] ABSTRACT

A multi-speed power transmission has five forward speeds and one reverse speed. The forward speeds consist of three underdrives, a direct drive and one overdrive. These speed ratios are produced with a simple planetary gearset, a compound planetary gearset, three input clutches, a combining clutch, a one-way clutch and two brake assemblies. Each of the brake assemblies incorporates a friction brake and a one-way brake. The combining clutch is disengaged in the low forward and reverse ratios and is engaged to connect the ring gears of the compound set with the carrier of the simple set. The one-way clutch is disposed between the ring gears of both sets to transmit rotation therebetween in an active capacity in the low forward ratio and no load capacity in the reverse ratio. In the second through fifth forward speeds, the one-way clutch permits relative rotation between the ring gears. The ring gear of the simple planetary gearset is continuously connected with the output shaft.

6 Claims, 1 Drawing Sheet

FIVE-SPEED POWER TRANSMISSION

TECHNICAL FIELD

This invention relates to multi-speed power transmissions.

BACKGROUND OF THE INVENTION

Automatic shifting power transmissions for passenger vehicles have progressed from two-speed gear assemblies to four-speed gear assemblies throughout the years. These have been accomplished for the most part with two planetary gearsets.

More recently, a desire for five-speed transmissions has arisen. These units extend the vehicle operating range and/or provide the intermediate gear ranges with improved performance and efficiency through improved utilization of the performance range of the internal combustion engine.

SUMMARY OF THE INVENTION

The present invention provides an improved automatic shifting power transmission having five forward speed ratios and one reverse speed ratio.

In one aspect of the invention, two planetary gearsets are combined with a plurality of clutches and brakes which are selectively actuated to establish five forward speed ratios and one reverse speed ratio. Only one of the forward speed ratios is an overdrive ratio.

In another aspect of the invention, one planetary gearset is a simple planetary set and the other is a compound planetary set with only the simple planetary set transmitting torque during the overdrive and reverse ratios.

In yet another aspect of the invention, the planetary sets are continuously interconnected between the sun gears, selectively connected by a one-way clutch between the ring gears during the lowest forward ratio and selectively connected between the simple planet carrier and the compound planet ring gear during all forward ratios except the lowest forward ratio.

In still another aspect of this invention, the forward overdrive ratio is established in the simple planetary set, such that only two gear meshes are active in transmitting the torque from the input shaft to the output shaft thereby improving the overall efficiency of the power transmission.

DESCRIPTION OF AN EXEMPLARY EMBODIMENT

Figures 1, 2:
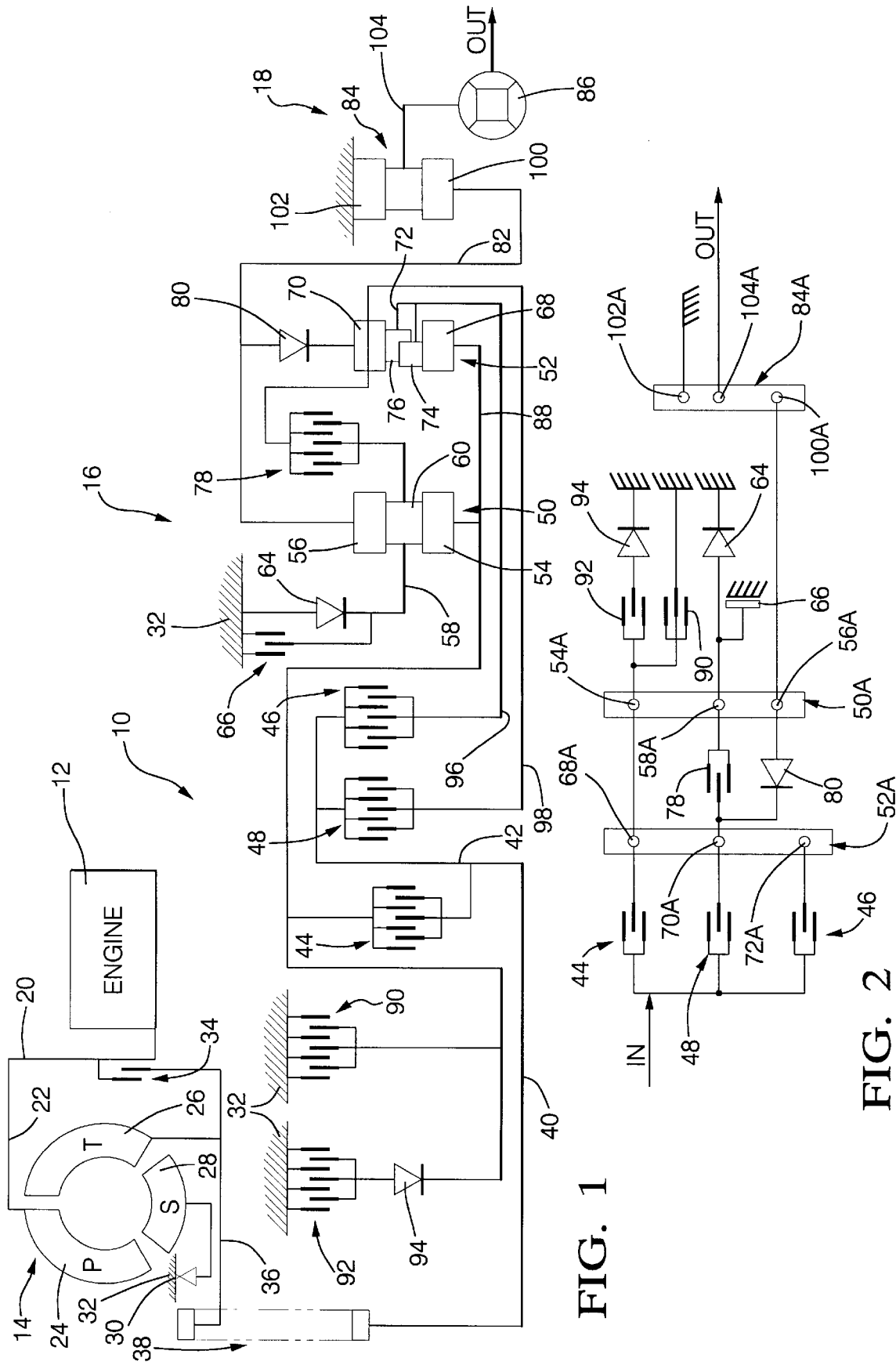
FIG. 1 is a schematic diagram of a transmission incorporating the present invention.
FIG. 2 is a lever diagram representing the gear scheme shown in FIG. 1.

Referring to FIG. 1, there is seen a vehicle powertrain generally designated 10 incorporating an engine 12, a torque converter 14, a planetary gear arrangement 16 and a final drive assembly 18.

The engine 12 is a conventional internal combustion engine which has an output portion, such as a flywheel 20, having a drive hub 22 drivingly connected with a pump or impeller 24 of the torque converter 14. The torque converter 14 is a conventional fluid hydro-dynamic device including the impeller 24, a turbine 26 and a stator 28 which are connected in a well-known toroidial flow path, such that power is transmitted from the pump 24 to the turbine 26. The stator provides torque multiplication during the torque conversion range and to that end is connected through a one-way brake 30 with a transmission housing 32.

The torque converter 14 and engine 12 are also selectively connectible through a selectively engageable torque converter clutch 34 which is operable in a well known manner to connect the engine 12 directly with the turbine 26 at a shaft 36 which is the output shaft of the torque converter 14. The torque converter 14 provides power through a chain drive 38 to a transmission input shaft 40 in a conventional manner.

The transmission input shaft 40 is connected with an input hub 42 which forms a part of a selectively engageable clutch or friction device 44, a selectively engageable ratio clutch or friction device 46 and a selectively engageable ratio clutch or friction device 48. These clutches 44 through 48 are components of the planetary gear arrangement 16. The planetary gear arrangement 16 also includes a simple planetary gearset 50 and a compound planetary gearset 52. The simple planetary gearset 50 includes a sun gear 54, a ring gear 56 and a carrier assembly 58 which includes a plurality of rotatably mounted pinions 60 meshing with the sun gear 54 and ring gear 56. The carrier assembly 58 is connectible with the transmission housing 32 through a one-way device 64 and a selectively engageable brake or friction device 66.

The compound planetary gearset 52 includes a sun gear 68, a ring gear 70 and a planet carrier assembly 72. The carrier assembly 72 includes a plurality of rotatably mounted pinion gears 74 which mesh with the sun gear 68 and a plurality of rotatably mounted pinion gears 76 which mesh with the ring gear 70 and the pinion gears 74. The intermeshing pinion gears are essentially what determines the compound planetary gearset.

The ring gear 70 of the compound gearset 52 is connectible with the carrier assembly 58 of the simple gearset 50 through a selectively engageable clutch or friction device 78. The ring gear 70 is selectively connectible with the ring gear 56 through a one-way clutch device 80 which is also connected with an output hub 82 of the planetary gear arrangement 16. The output hub 82 is connected to a final drive planetary gearset 84 which in turn is drivingly connected with a conventional differential gearset 86. The final drive planetary 84 and the differential gearset 86 provide the components for the final drive 18.

The sun gear 54 and sun gear 68 are interconnected by a shaft member 88 which is also connectible with the transmission input shaft 40 by actuation of the clutch 44 and may be grounded by a selectively engageable brake or friction device 90 or a selectively engageable brake or friction device 92 in serial arrangement with a one-way brake 94. Thus, the sun gears 54 and 68 can be utilized as input planetary members or as reaction planetary members depending on the actuation of the friction devices 44, 90 and 92 associated therewith.

The carrier assembly 72 is connected through a shaft 96 with the clutch 46 and the ring gear 70 is connected with the clutch 48 through a shaft 98. Thus, the carrier assembly 72 can provide an input member for the planetary gear arrangement as can ring gear 70.

Through selective actuation of the clutches and brakes, five forward speeds and one reverse speed can be established within the planetary gear arrangement 16. The friction clutches and brakes are conventional fluid operated friction devices. The friction brakes may be either of the disc type or of the band type brake. In either event, the brakes will connect the respective gear members with the transmission housing 32 while the clutches will either connect the planetary member with the input shaft 40 or in the case of clutch 78 interconnect to planetary members.

To establish the first and lowest forward speed, the clutch 46 is selectively engaged such that input power is provided to the planet carrier assembly 72. The planet carrier assembly 72 will attempt to rotate the ring gear 70 which will react on the output 82 and instead will force the sun gear 68 and sun gear 54 to rotate. The one-way device 64 will provide a reaction point at the carrier assembly 58 resulting in forward rotation of the ring gear 56 and the ring gear 70 will also rotate forwardly at the same speed as ring gear 56 through the intercession of the one-way device 80. The lowest ratio is a function of the ring to sun ratios of both planetary gear arrangements.

To establish the second forward speed, the clutch 78 is engaged. When the clutch 78 is engaged, the one-way device 64 prevents rotation of both the ring gear 70 and the carrier assembly 58 such that the power flow from the input shaft 40 is via clutch 46 to the carrier assembly 72 and then through the sun gears 68 and 54 to the ring gear 56 which is connected to the output 82. In this ratio, the ring gear 56 will run faster than the ring gear 70 which is stationary. The one-way clutch 80 will be in an overrunning or free-running condition. The second ratio is also determined by the ring gear to sun gears of both planetary gearsets 50 and 52.

To establish the third forward ratio, the brake 92 is engaged such that the sun gears 68 and 54 are held stationary and become reaction members in the planetary gear arrangement through the intercession of the one-way device 94. Since the sun gears 68 and 54 are prevented from rotating, the ring gear 70 will be driven forwardly at a reduced ratio as will the carrier 58. The one-way device 64 will permit the carrier to rotate in the forward direction which in turn will cause the ring gear 56 and therefore output 82 to be rotated in the forward direction at a speed faster than what is present in the second ratio for a given engine speed. Thus, on the shift from first to second, a one-way device is incorporated within the gear train, that is, the device 80 is disengaged while the device 64 is engaged, on the 2-3 ratio interchange the one-way device 94 becomes active while the one-way device 64 becomes inactive. As with both the first and second ratios, the third forward ratio is also determined by the ring to sun ratios of both planetary gearsets.

Should it be desirable to have engine coast braking in the first or second range, the friction brake 66 can be engaged in the second range to provide a positive brake on the carrier assembly 58 while in third range, the brake 90 can be engaged to provide a positive brake on the sun gears 68 and 54.

The fourth forward ratio is established by engaging the clutch 48. With the clutch 48 and the clutch 46 engaged, and the clutch 78 engaged, the planetary gear arrangement 16 is essentially a single rotating device since at least two members of each of the planetary gearsets 50 and 52 are driven by the engine. This provides a 1:1 drive ratio such that the input and output speeds are essentially equal.

To establish the fifth forward ratio, the clutch 46 is disengaged and the brake 90 is engaged while the clutch 78 remains engaged. This provides a drive directly from the transmission input shaft 40 to the carrier assembly 58. Since the sun gear 54 is grounded through the brake 90, an overdrive ratio is produced at the ring gear 56 and therefore the output 82. Thus, the transmission output will rotate faster than the transmission input in an overdrive condition.

The final drive planetary gearset 84 is, as shown, a reduction planetary gearset with a sun gear 100 being the input member, a ring gear 102 being the reaction member, and a carrier assembly 104 being an output member. The planetary arrangement for the final drive 84 is a simple planetary and, as is well known, with the sun gear driven and the ring gear held stationary, the carrier assembly will rotate at a reduced speed.

The reverse speed ratio is accomplished by the engagement of the brake 66 and the clutch 44. With this arrangement, the clutch 44 drives the sun gear 54 while the carrier assembly 58 is a reaction member producing a reverse rotation at a reduced speed at the ring gear 56. Thus, the reverse ratio incorporates only the ring to sun ratio of the simple planetary gearset 50.

An alternative reverse speed ratio is possible which will permit clutch 44 to be eliminated. The alternative reverse speed ratio can be accomplished by simultaneous engagement of clutches 46 and 48. When clutches 46 and 48 are simultaneously engaged, the double pinion planetary gearset is held in direct ratio and the engine input torque is transmitted directly to sun gear 54. The reaction remains the carrier assembly 58 by engagement of the brake 66. This arrangement will further simplify the present invention through the elimination of a clutch thereby reducing the number of components and the overall axial length.

The lever diagram shown in FIG. 2 uses the same numerical designations for points having similar or same functions with an "A" suffix. For example, the compound planetary gearset 52 is represented by the lever 52A while the simple planetary gearset 50 is represented by the lever 50A.

The lever diagram will illustrate the movements within the transmission during the various ratio selections. For example, in the first ratio, the clutch 46 is engaged such that the node 72A representing the carrier will be pushed in the direction of the input while the ring node 70A will react through the one-way device 80 against the output of ring node 56A. The sun node 68A will be urged to move in a direction opposite the input thereby carrying with it the sun node 54A which in turn will react through the carrier node 58A and the one-way device 64 to force the ring node 56A in the same direction as the input force. The other ratios can be followed by simply considering the engagement of the proper friction devices.

The low gear ratio will be 4.2 if the planetary ring and sun gears have the following number of teeth. Ring gear 56 has ninety teeth, sun gear 54 has forty teeth, sun gear 68 has forty teeth and ring gear 70 has one hundred twenty teeth. With these gear tooth assignments, the second forward ratio will be equal to 2.4 providing a step ratio between first and second of 1.75. The third gear ratio will be 1.35 providing a step ratio of 1.78 between second and third. The fourth ratio, as described above, is a direct ratio equal to one and the step ratio with third ratio is 1.35. The fifth ratio, an overdrive ratio, is equal to 0.75 and has a step ratio of 1.33 with the fourth ratio. The reverse ratio is equal to −3.0. The reverse ratio is determined simply by the number of teeth in ring gear 56 divided by the number of teeth in sun gear 54. The overdrive ratio is also determined solely by the ring to sun ratio of the simple planetary gearset.

Through proper selection of the number of teeth on the sun gear 100 and ring gear 102, the final drive ratios can be selected to provide N/V values of 21 to 31 in the fifth range and 127 to 171 in the first range. The N/V value is, of course, the ratio of engine speed to vehicle speed and is a common measure used in describing vehicle performance.

The ratio of the chain drive 38 can also be utilized to effect the overall ratio from the engine to the final search drive. In the exemplary embodiment, the chain ratio is set at one. That is, the chain 38 has input and output sprockets of equal diameter and tooth members.

As described above, the power transmission provides a power transmission having five forward speeds and one reverse speed, with only one of the forward speeds being an overdrive ratio. Also, it should be recognized that during the overdrive ratio, only the meshes of the simple planetary gearset 50 are utilized, thus reducing the number of gear meshes to a minimum and thereby increasing the efficiency of the transmissions.

The arrangement also maintains the torque on the sun gears at a minimum level throughout the gear ratios. The spin losses, that is, the difference of speeds in the disengaged friction devices are also maintained at low levels.

The planetary gear arrangement 16 has essentially two interconnection arrangements. In first and reverse, the interconnected elements are the sun gears and the ring gears, while in the second through fifth forward ratios, the interconnected members are the sun gears and the compound ring gear of the simple planet carrier. The change between these connection arrangements is provided by the use of a one-way device such that the shifting from one planetary gear arrangement to another is essentially unnoticed by the operator.

I claim:

1. A power transmission comprising:
   an input shaft;
   an output shaft;
   first, second and third selectively engageable clutch means drivingly connected with said input shaft;
   a first planetary gearset having a first sun gear connected with said third clutch means, a first compound pinion carrier assembly drivingly connected with said first clutch means; and a first ring gear connected with said second clutch means;
   a second planetary gearset having a second sun gear continuously connected with said first sun gear, a second carrier assembly having a plurality of pinion gears rotatably mounted thereon in meshing relation with said second sun gear, and a second ring gear meshing with said pinion gears and continuously drivingly connected with said output shaft;
   a fourth selectively engageable clutch means connectable between said first ring gear and said second carrier assembly;
   a first rotationally sensitive clutch means for interconnecting said first ring gear and said output shaft;
   first brake means for selectively preventing rotation of said second carrier assembly;
   second selectively engageable brake means for preventing rotation of said first and second sun gears; and
   said clutch means and said brake means being engageable in combinations to control the establishment of five forward speed ratios between said input and output shafts, said first clutch means being engaged during four of the forward speed ratios exclusive of a highest forward speed ratio and said fourth clutch means being engaged during four of the forward speed ratios exclusive of a lowest forward speed ratio.

2. The power transmission defined in claim 1 wherein said first brake means is engaged during both lowest forward speed ratio and a reverses speed ratio and wherein said third clutch means is selectively connectable between said input shaft and said sun gears of both planetary gearsets and is engaged to cooperate with said first brake means when said reverse speed ratio is to be established.

3. The power transmission defined in claim 1 wherein said second and fourth clutch means and said second brake means are engaged to establish the fifth forward ratio in said second planetary gearset.

4. A power transmission comprising:
   an input shaft;
   an output shaft;
   first, and second selectively engageable clutch means drivingly connected with said input shaft;
   a first planetary gearset having a first sun gear, a first compound pinion carrier assembly drivingly connected with said first clutch means; and a first ring gear connected with said second clutch means;
   a second planetary gearset having a second sun gear continuously connected with said first sun gear, a second carrier assembly having a plurality of pinion gears rotatably mounted thereon in meshing relation with said second sun gear, and a second ring gear meshing with said pinion gears and continuously drivingly connected with said output shaft;
   a third selectively engageable clutch means connectable between said first ring gear and said second carrier assembly;
   a first rotationally sensitive clutch means for interconnecting said first ring gear and said output shaft;
   first brake means for selectively preventing rotation of said second carrier assembly;
   second selectively engageable brake means for preventing rotation of said first and second sun gears; and
   said clutch means and said brake means being engageable in combinations to control the establishment of five forward speed ratios between said input and output shafts, said first clutch means being engaged during four of the forward speed ratios exclusive of a highest forward speed ratio and said third clutch means being engaged during four of the forward speed ratios exclusive of a lowest forward speed ratio.

5. The power transmission defined in claim 4 wherein said first brake means is engaged during both lowest forward speed ratio and a reverses speed ratio and wherein said first and second clutch means are selectively engaged to cooperate with said first brake means when said reverse speed ratio is to be established.

6. The power transmission defined in claim 4 wherein said second and third clutch means and said second brake means are engaged to establish the fifth forward ratio in said second planetary gearset.

* * * * *